D. G. Coppin,
Lock Hinge.
Nº 50,099.   Patented Sep. 26, 1865.
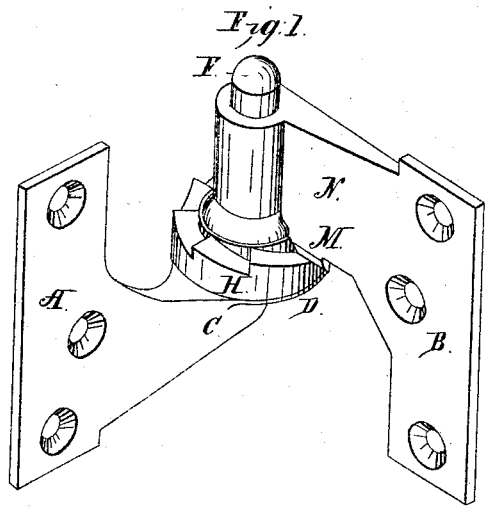
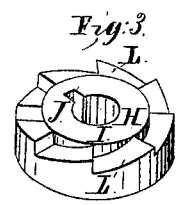
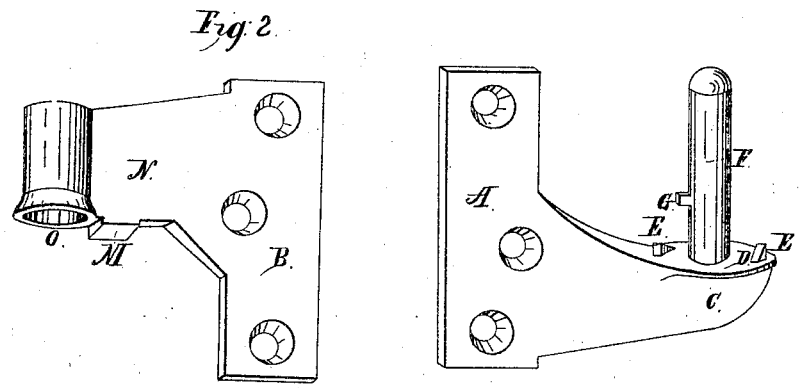
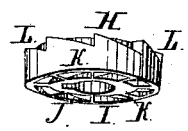
Witnesses
James H. Layman
Geo. B. Nicholson
Inventor:
D. G. Coppin
By Knight Bros
Attys

UNITED STATES PATENT OFFICE.

DANIEL G. COPPIN, OF CINCINNATI, OHIO.

SHUTTER-HINGES.

Specification forming part of Letters Patent No. 50,099, dated September 26, 1865.

*To all whom it may concern:*

Be it known that I, DANIEL G. COPPIN, of Cincinnati, Hamilton county, Ohio, have invented a new and useful Shutter-Hinge; and I do hereby declare the following to be a full, clear, and exact description thereof, reference being had to the accompanying drawings, making part of this specification.

My invention relates to a form of self-locking hinge adapted to hold the shutter to an open or closed position, or to any bowed or partly-open position at which it may be placed, with sufficient stability to resist any ordinary wind, but with sufficient mobility to yield to a force that would endanger the shutter or the hinges.

Figure 1 shows the half-open position of a left-hand hinge embodying my invention. Fig. 2 shows the parts in the open position and detached from each other. Fig. 3 represents a double ratchet-plate for a right-hand hinge.

My hinge is attached to the jamb and shutter, repectively, by customary leaves, A and B. The plane of the leaf A is continued in the form of a bracket, C, having a horizontal circular collar, D, armed with one or more ratchet-teeth, pawls, or talons, E, and with a vertical pin, F, from one side of which there projects a tongue, G.

H is a circular plate having a central perforation, I, and notch J, to pass over the pin F and tongue G, and armed above and below with oppositely directed ratchet-teeth K and L, of which the lower teeth, K, operate in connection with the pawls M on the lower edge of the bracket N, which projects from the leaf B. The bracket N bears a socket, O, which slips over the pin F and vibrates thereon as an axis.

The above illustrates a left-hand hinge.

The right-hand hinge will be precisely similar, except in the opposite direction of the ratchets. (See representation of a double ratchet-plate for a right-hand hinge at Fig. 3.)

The operation of my improved hinge is as follows: Supposing the shutter to be closed, then, in order to open the same, you push it outward, causing its talon M to ride over the ratchet-plate, which remains stationary until the talon reaches the first upper ratchet, when you have the shutter slightly open or bowed. Should you want it more open you again push the shutter out until the talon reaches the next ratchet, and so on until the shutter is entirely open, the last ratchet acting to press the shutter firmly open againt the wall. To close the shutter you have but to move it the reverse way, and the talon on the movable half of the hinge carries back the ratchet-plate to its original position, the ratchet-plate riding up over the teeth E. If disposed to have the shutter full open, you have but to simply push it back and it will ride up over the intervening ratchets to the position.

The angles of the ratchets are to be so formed as to prevent the disturbance of the shutter by a slight breeze, yet to permit its easy movement by hand, or by such stress of wind as would endanger the hinge.

The tongue G is to prevent the removal of the ratchet-plate by meddlesome children when the shutter is unshipped for cleaning or repair.

The present illustration has been selected as the preferred type of my invention, but various modifications are possible—for example, a self-locking hinge on the above plan might have the ratchets pointing in the opposite direction.

I claim herein as new and of my invention—

The arrangement of double ratchet-plate H with the teeth, pawls, or talons E and M upon the fixed and movable members of the hinge, respectively.

In testimony of which invention I hereunto set my hand.

DANIEL G. COPPIN.

Witnesses:
GEO. H. KNIGHT,
JAMES H. LAYMAN.